Figure 1:
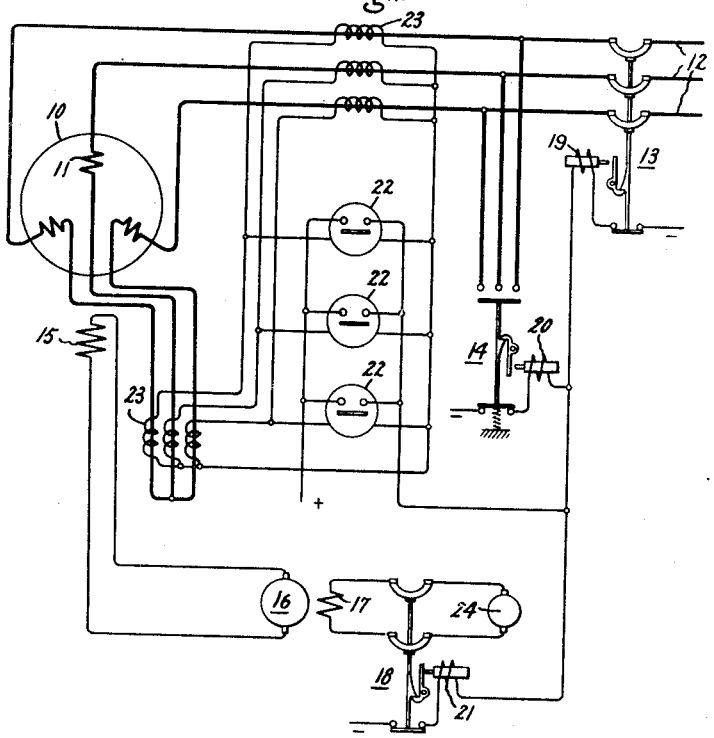

Jan. 10, 1950  H. R. SILLS  2,494,365
GENERATOR FAULT PROTECTION
Filed Dec. 20, 1944

Inventor:
Hubert R. Sills,
by Harry E. Dunham
His Attorney.

Patented Jan. 10, 1950

2,494,365

UNITED STATES PATENT OFFICE 2,494,365

GENERATOR FAULT PROTECTION

Hubert R. Sills, Peterborough, Ontario, Canada, assignor to General Electric Company, a corporation of New York Application December 20, 1944, Serial No. 568,967
In Canada March 16, 1944

5 Claims. (Cl. 175—294)

My invention relates to the protection of alternating current generators against damage on the occurrence of internal faults.

When a fault occurs in the armature winding of a generator between points of different potential, such as between different phase windings, between a winding and ground or between turns of a phase winding it is imperative to deenergize the generator to limit the damage thereto. To this end it is cutomary to provide relays responsive to circuit conditions arising from the presence of a fault to open the armature circuit and the field circuit automatically. As the damage to a machine mounts as the fourth or fifth power of the time the arc at the fault persists it is apparent that as early an extinction of the arc as possible should be had. High speed relay and circuit breaker apparatus has been devised which opens the circuits very quickly but this however does not instantly extinguish the arc for the reason that the continued rotation of the field continues to develop a voltage in the faulted conductors by the established flux in the magnetic circuit of the machine. The time required for the removal of voltage from the arc and its consequent extinction will therefore depend on the rate at which the excitation decays which it does exponentially depending on the relative resistance and inductance of the machine circuits. The unit used to describe it is the time required for the excitation to drop to $1/\epsilon$ of its initial value. This time is known as the time constant. This value can be shortened within limits by changing the value of the discharge resistance usually inserted across the field winding. Large machines have a time constant of 7 or 8 seconds and with normal discharge resistors it may take 10 seconds or more after the circuit breakers open in response to the presence of a fault for the established flux to be dissipated and the arc extinguished. This time is long enough to permit considerable damage to be done and may result in the loss of a number of coils and damage to the iron of the magnetic circuit.

The object of my invention is to provide protection for electric generators against aggravated damage due to the persistence of faults; which will extinguish the arc promptly and mitigate the difficulties due to the above mentioned persistence of the arc arising from the persistence of the flux in the magnetic circuit.

The objects and advantages of my invention will become apparent from the following detail description of a generator protective system embodying my invention, and the features of novelty which characterize my invention will be pointed out in the claims annexed to and forming part of this specification.

Figure 2:
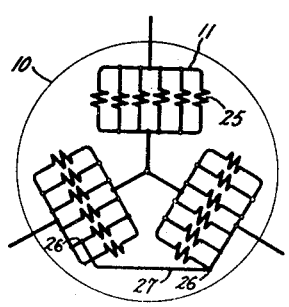

In accordance with my invention, I provide in a generator protective system means for automatically short circuiting the terminals of a generator on the occurrence of a fault. On the accompanying drawing Fig. 1 illustrates a protective system embodying my invention; and Fig. 2 is an explanatory diagram. On the drawing 10 represents a generator having a three phase star or Y connected armature winding 11 having one end of each of the phase windings connected to one of the three conductors of the three conductor bus system 12 through a latched closed circuit breaker 13. The other ends of the three phase windings are connected together. A latched open circuit closer 14 is arranged on release to connect the three line terminals of the generator together. The generator field is indicated at 15 energized by an exciter 16. The exciter field 17 is energized by a separate source shown at 24 as a direct current machine and is closed by a latched closed circuit breaker 18. The devices 13, 14 and 18 are provided with trip coils 19, 20 and 21 respectively.

The particular form of detecting circuit applied to the generator whereby in the presence of a fault therein energy is supplied to the trip coils does not of itself form part of my invention. Any known type of fault detecting arrangement which acts rapidly to close the contacts of a relay may be used. For purposes of illustration I have shown a simple form of well known differential protection. As shown each of the phase windings has a pair of current transformers 23, one applied to the terminal end and the other to the neutral end thereof. Each pair of current transformers is differentially connected to a relay 22.

With the parts in the position shown in the drawing, if a fault occurs in the generator one or more of the relays 22 very rapidly closes its contacts and completes a control circuit through the trip coils 19, 20 and 21. The setting of the devices 13, 14 and 18 and their trip apparatus is such that they operate simultaneously, or the circuit closer 14 may operate slightly after the circuit breaker 13. The circuit breaker 13 disconnects the armature from the bus 12 and the circuit breaker 18 opens the field circuit 17 of the exciter. The closing of the circuit closer 14 connects together the terminal ends of the generator phase windings and the established flux is thereby shunted away from linkage with these windings and consequently from linkage with any faulted coil or coils therein, hence the voltage across the fault is instantly removed and the arc is extinguished.

While the diagram of the alternator shown in the protective system of Fig. 1 indicates a single circuit Y winding the large machines on which the system of protection will prove most valuable are almost invariably multicircuit machines. In Fig. 2 I have shown diagrammatically a machine 10 having the armature winding 11 composed of six circuits. It will be observed that each phase has six circuits 25 connected together in parallel. I have indicated at 26 a fault between one of the six circuits of one phase and one of the six circuits of another phase. A heavy line 27 indicates the short circuit conditions existing between the faulted circuits. Assume as an example that the normal current for the machine is 3000 amperes, and thus the normal current in each of the six circuits will be 500 amperes. If the terminals of the machine are short circuited, and assuming the fault current is five times the normal, the current in each circuit will be 2500 amperes. However, faults in a machine do not occur at the terminals but between a coil in one circuit and a coil in another circuit, as illustrated for example in Fig. 2. Thus current in this fault 27 will be the 2500 amperes generated in the faulted circuit plus five times 2500 amperes representing the current generated in the five other parallel circuits which also feed through it. Thus the current through a circuit conductor designed to carry a normal 500 amperes will be carrying 15,000 amperes, that is thirty times its normal value. Hence as the damage is proportional to the amount of overcurrent the damage due to the current fed into the fault by the parallel circuits is severe and it cannot be isolated as these circuits are permanently connected to the faulted circuit. However, by closing a short circuiting switch across the terminals of the machine in accordance with my invention the voltage in the machine circuits is immediately reduced to zero and the current due to this short circuit now flows through a circuit including the short circuiting switch capable of sustaining it instead of through the arc in the coils of the faulted circuit. Inasmuch as the total current through the short circuiting switch is determined by the reactance of the machine the value of this current is just sufficient to reduce flux linkages with the stator winding to zero, so that the voltage in each and every coil becomes zero and there is therefore no voltage across the fault to sustain the arc which is therefore extinguished.

The provision of separate devices for disconnecting and for short circuiting and the operating of these devices independently from the same impulses provided by the relay protection circuit has the advantage that should one of the devices fail the other will give a measure of protection. Should the breaker 13 fail to open and 14 close it will fault the system as well as the machine and the back-up breakers customarily provided will function and save the machine. If, on the other hand, the circuit closer 14 fails to function the machine will have the customary protection provided by the opening of the breaker 13 and the field but without the benefit of my invention.

In the customary generator protective systems it is usual to provide a circuit breaker in the generator field which opens on the occurrence of the fault and connects a discharge resistor across the field. When protection is provided by short circuiting the generator terminals in accordance with my invention the speed of build down of the generator field is no longer important and the field circuit breaker and resistor may be omitted, the field being deenergized by the much simpler and cheaper means for opening the exciter field circuit as indicated in the drawing.

The rapid extinction of the arc in a few cycles after it forms accomplished by the use of my invention removes the danger of fire which would be caused by the persistence of the arc igniting the insulation and consequently the need for special arrangements for extinguishing such fires may be eliminated.

While I have illustrated my invention as applied to a star connected generator it is apparent that it is equally applicable to a delta connected generator, and while I have illustrated a simple form of fault detecting circuit it is apparent that any suitable form of detecting circuit may be used, preferably one which is also responsive to turn faults whereby the full advantages of the protection of my invention may be obtained.

What I claim as new and desire to secure by Letters Patent of the United States is:

1. An arrangement for protecting a separately excited dynamoelectric machine from damage resulting from persistence of an arc arising from a fault in its armature winding comprising means responsive to the occurrence of a fault in the armature winding for completing a low impedance circuit across the armature terminals of the machine.

2. An arrangement for protecting a separately excited dynamoelectric machine from damage resulting from persistence of an arc arising from a fault in its armature winding which is connected to an electric system by a circuit interrupter comprising means responsive to the occurrence of a fault in the armature winding for effecting the opening of said interrupter and the completion of a low impedance circuit across the armature terminals of the machine.

3. An arrangement for protecting a separately excited dynamoelectric machine from damage resulting from persistence of an arc arising from a fault in its armature winding which is connected to an electric system by a circuit interrupter comprising means responsive to the occurrence of a fault in the armature winding for effecting the opening of said interrupter and the completion of a low impedance circuit across the armature terminals of the machine and a decrease in the field excitation of said machine.

4. An arrangement for protecting a separately excited multiphase alternating current generator from damage resulting from persistence of an arc arising from a fault in its armature winding comprising means responsive to the occurrence of a fault in the armature winding for short circuiting the armature terminals of the generator.

5. An arrangement for protecting a separately excited multiphase alternating current generator from damage resulting from persistence of an arc arising from a fault in its armature winding which is connected to an alternating current system by a circuit interrupter comprising means responsive to the occurrence of a fault in said armature winding for effecting the opening of said interrupter and the completion of a short circuit across the armature terminals of said generator.

HUBERT R. SILLS.

REFERENCES CITED

The following references are of record in the file of this patent:

UNITED STATES PATENTS

| Number | Name | Date |
|---|---|---|
| 494,608 | Van Denburgh et al. | Apr. 4, 1893 |
| 1,718,980 | Ringwald | July 2, 1929 |
| 1,867,416 | Merrick | July 12, 1932 |
| 2,262,651 | Reagan | Nov. 11, 1941 |
| 2,324,825 | Crary | July 20, 1943 |